「12」 United States Patent
Ohta et al.

(10) Patent No.: US 7,089,084 B2
(45) Date of Patent: Aug. 8, 2006

(54) SEARCH ROBOT SYSTEM

(75) Inventors: Yoshiji Ohta, Kashiwara (JP); Masaki Hamamoto, Sakurai (JP); Keita Hara, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 141 days.

(21) Appl. No.: 10/447,075

(22) Filed: May 27, 2003

(65) Prior Publication Data

US 2004/0140404 A1    Jul. 22, 2004

(30) Foreign Application Priority Data

May 27, 2002    (JP)    ............................. 2002-152559

(51) Int. Cl.
*G06F 19/00*    (2006.01)
(52) U.S. Cl. ...................... 700/245; 700/248; 700/249; 700/250; 700/251; 700/252; 701/23; 701/28; 701/47; 701/200; 701/213; 701/217; 901/47
(58) Field of Classification Search ................ 700/245, 700/248–251, 96, 262, 225, 250, 258–259; 701/23, 28, 47, 200, 213, 217; 901/47
See application file for complete search history.

(56) References Cited

U.S. PATENT DOCUMENTS

| 6,233,503 | B1* | 5/2001 | Yim et al. | 700/245 |
| 6,243,622 | B1* | 6/2001 | Yim et al. | 700/245 |
| 6,459,957 | B1* | 10/2002 | Bennett et al. | 700/245 |
| 6,496,755 | B1* | 12/2002 | Wallach et al. | 700/245 |
| 6,512,345 | B1* | 1/2003 | Borenstein et al. | 318/568.12 |
| 6,636,781 | B1* | 10/2003 | Shen et al. | 700/248 |
| 6,687,571 | B1* | 2/2004 | Byrne et al. | 700/245 |
| 6,725,128 | B1* | 4/2004 | Hogg et al. | 700/245 |
| 2001/0056396 | A1* | 12/2001 | Goino | 705/37 |
| 2002/0117583 | A1 | 8/2002 | Hamamoto et al. | 244/72 |

FOREIGN PATENT DOCUMENTS

JP    09-240521    9/1997

OTHER PUBLICATIONS

Amstutz et al., Real time visualization of robot state with mobile virtual reality, 2002, Internet, pp. 1-8.*
Warren, A vector based approach to robot path planning, 1991, IEEE, pp. 10211026.*

(Continued)

*Primary Examiner*—Thomas G. Black
*Assistant Examiner*—McDieunel Marc
(74) *Attorney, Agent, or Firm*—David G. Conlin; David A. Tucker; Edwards Angell Palmer & Dodge LLP

(57) ABSTRACT

A search robot system first divides the entire area of disaster into a mesh cell of an appropriate size, and arranges a search robot for each mesh cell. A search is made for a route of travel from an outermost mesh cell to a casualty and to an adjacent mesh cell. The search robot immediately communicates with a mother robot when a casualty is found. The search robot also communicates with the mother robot when a route to an adjacent mesh cell is found. In the search robot system, a new search robot is arranged to search in an adjacent mesh cell. Accordingly, a rescue activity that is a matter of time can be carried out by a plurality of robots.

23 Claims, 11 Drawing Sheets

OTHER PUBLICATIONS

Tadodoro et al., A portable parallel manipulator for search adn rescue at large-scale urban earthquakes and an identification algorithm for the installation in unstructured environments, 1991, IEEE, pp. 1222-1227.*

Sharke, Mock urban ruin puts robots to real test: Get teh ingineering scoop, 2000, Internet, pp. 1-8.*

Amano, present status and problems of fire fighting robots, 2002, Internet, pp. 880-885.*

Erkmen et al., Snake robots to teh rescue, 2002, IEEE, pp. 17-25.*

Zheng et al., Develpment of human-machine interface in disaster-purposed search robot systems that serve as surrogates for human, 2004, IEEE, pp. 225-230.*

Spice, Simulated rubble field tests search and rescue robots, 2003, Post-gazette.com Health & Science, Internet, pp. 1-3.*

* cited by examiner

SEARCH ROBOT SYSTEM

BACKGROUND OF THE INVENTION

1. Field of the Invention

The present invention relates to search robot systems, particularly a search robot system realizing efficient rescue activities.

2. Description of the Background Art

Research and development of robots searching for victims in disaster are now in progress. These robots such as a rescue robot will look for casualties while removing obstacles such as rubble using a multi-degree-of-freedom manipulator. The usage of such robots will allow access to harsh environments such as an area with the danger of disruption, fire disaster, toxic gas, and the like as a substitute for people such as a rescue team member or firemen to proceed to saving one's life.

The robots are expected to move large mountains of rubble as well as transporting a victim outside the area of disaster.

Japanese Patent Laying-Open No. 9-240521 discloses a method of conducting rescue activity using a rescue robot that can run even on irregular ground.

In reality, the region of disaster differs greatly from the typical site of well-ordered plants and offices, and often present complicated environments with many obstacles. Producing a robot that can run over such sites or move forward while removing obstacle involves the problem of requiring a relatively large size, complicated mechanism, and high cost per apparatus.

For example, the height of an obstacle that can be passed over by a rescue robot such as that disclosed in the aforementioned Japanese Patent Laying-Open No. 9-240521 depends upon the maximum length between the leading end and trailing end of the crawler. If the robot is to run over the ruins of a building, the robot must be large enough for such purpose.

It is to be noted that the work operation of removing obstacles by means of such large robots without ascertaining the presence/absence of a victim or the accurate location of a victim is not effective. There is a possibility of risking a victim's life through secondary contingency.

Furthermore, not all obstacles may be removed. There is a problem that the range of search by a large robot is limited.

SUMMARY OF THE INVENTION

In view of the foregoing, an object of the present invention is to provide a search robot system employing a compact and economic search robot that can access the corners of the site of disaster and identify accurately the location of a victim so as to conduct rescue activities efficiently.

The above object is achieved by a search robot system including features set forth below. A search robot system includes at least one search robot, a division unit dividing a search region into at least one mesh cell, and an arrange unit arranging a search robot.

The search robot system preferably initiates a search from the outermost mesh cell among the mesh cells in contact with the boundary of the search region.

The arrange unit preferably arranges another search robot differing from the search robot arranged in the outermost mesh cell for the search in an inner mesh cell among the mesh cells not in contact with the boundary of the search region.

The arranged search robot preferably moves to a mesh cell adjacent to the current mesh cell to continue a search.

The arrange unit preferably arranges another search robot differing from the arranged search robot for a search in a mesh cell adjacent to the current mesh cell.

The search robot system preferably conducts a search along the surface of an obstacle.

The search robot preferably includes a detection unit detecting at least one of an obstacle and a surface of an obstacle using at least one of a sonar and an infrared ray.

Preferably, the search robot further includes a mapping unit to conduct mapping based on search information.

Preferably, the search robot further includes a first position information detection unit detecting position information by at least one of an acceleration sensor and an angular acceleration sensor.

Preferably, the search robot further includes a second position information detection unit detecting position information through a GPS (Global Positioning System).

Preferably, the search robot further includes a search region detection unit detecting whether there is a cavity to be searched in an obstacle based on sonar information obtained from the surface of the obstacle.

According to another aspect of the present invention, a search robot system includes at least one mother robot arranged outside an obstacle, and a search robot conducting a search of at least one of a neighborhood of an obstacle and inside an obstacle. Each of a mother robot and a search robot includes a communication unit for communication with each other.

The communication unit of the mother robot preferably conveys a range of search to the search robot.

Preferably, the mother robot further includes a position detection unit detecting the position of a search robot based on a signal received from the search robot. The communication unit of the mother robot preferably conveys the detected position to the search robot.

Preferably, the mother robot further includes a mapping unit to conduct mapping based on information received from a search robot. The communication unit of the mother robot preferably conveys a next target to be searched, based on mapping, to the search robot.

Preferably, the mother robot further includes a position change detection unit detecting change in position of an obstacle. The communication unit of the mother robot preferably conveys the detected change of an obstacle position to the search robot.

Preferably, the mother robot further includes an arrange unit to arrange another rescue robot differing from the arranged search robot when the current search robot can no longer conduct a search.

Preferably, at least one of the mother robot and the search robot further includes a communication relay unit to relay communication with another mother robot differing from the current mother robot and another search robot differing from the current search robot.

Preferably, at least one of the mother robot and the search robot further includes a charge unit charging another search robot differing from the current search robot.

Preferably, at least one of the mother robot and the search robot further includes a power supply relay unit to relay power supply to another search robot differing from the current search robot.

Preferably, the mother robot further includes a flight unit.

Preferably, the search robot further includes a first sense unit sensing a vital sign.

Preferably, the search robot further includes a second sense unit sensing body heat.

Preferably, the search robot further includes a determination unit determining, based on at least one of the vital sign sensed by the first sense unit and the body heat sensed by the second sense unit, whether the sensed one is of a human being or another animal.

Preferably the search robot further includes a transmission unit transmitting, when a human being or another animal alive is sensed by at least one of the first and second sense units, that information to an external source.

Preferably, the search robot further includes a notification unit notifying, when a human being alive is sensed by at least one of the first and second sense units, the presence of a search robot.

Preferably, the search robot further includes a conversation unit establishing conversation, when a human being alive is sensed by at least one of the first and second sense units, between the sensed human being and a searcher.

Preferably, the search robot system further includes an output unit providing, when an object of search is sensed, route information up to the position of the sensed object.

Preferably, the search robot system further includes a guide unit guiding, when an object of search is sensed, up to the position of the sensed object.

Preferably, the search robot further includes a flight unit.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
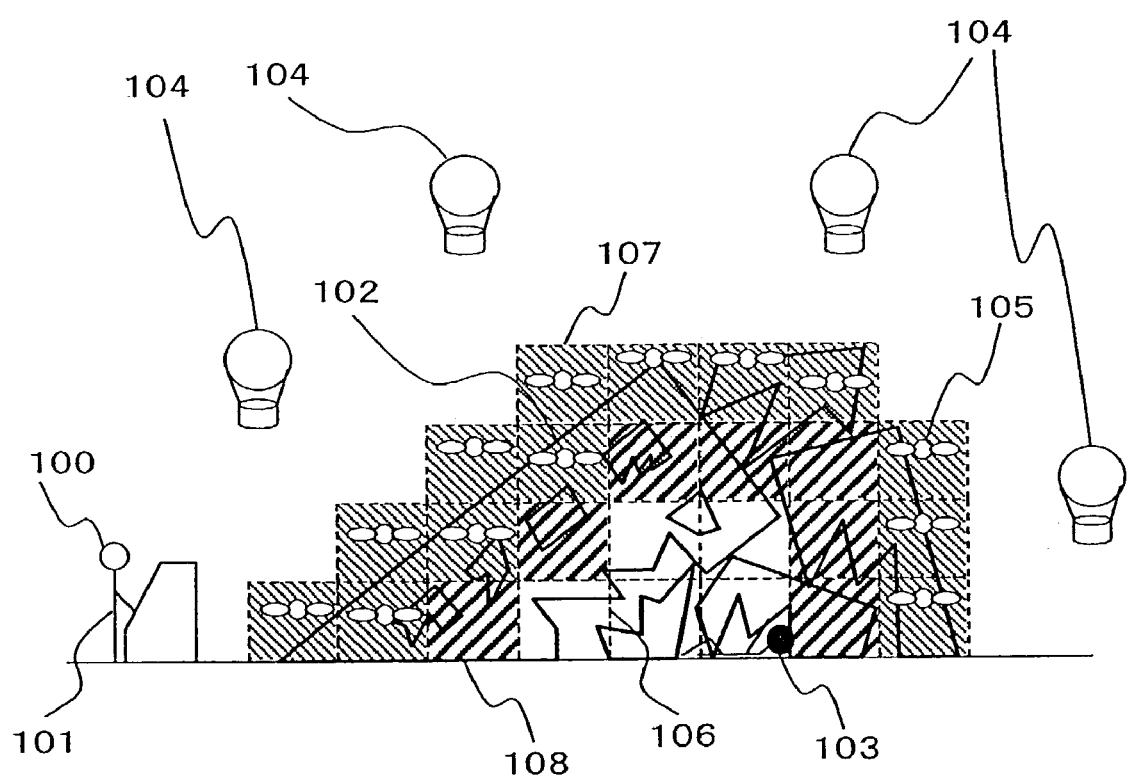
FIG. 1 shows a specific example of a search robot system according to an embodiment of the present invention.

An embodiment of the present invention will be described hereinafter with reference to the drawings. In the following, the same components and elements have the same reference characters allotted. allotted. Their designation and features are identical. Therefore, detailed description thereof will not be repeated.

Referring to FIG. 1, the search robot system according to an embodiment of the present invention includes a base station 100, a mother robot 104 that is a balloon type robot, and a search robot 105 that is a fluttering type robot.

In such a search robot system, an operator 101 operates base station 100 to search for a casualty 103. Specifically, a casualty 103 trapped inside an obstacle 102 at the ruins of a collapsed building or the like is to be searched for.

A search method employing a search robot system of the present embodiment will be described hereinafter. For the sake of simplification, description is based on a two-dimensional representation of a region of disaster viewed from one direction.

First, the search robot system arranges a mother robot 104 up in the sky, above and at the side of the area of disaster. Mother robot 104 conducts:

(A-1) mapping of the entire area of disaster;

(A-2) re-mapping required as caused by continuous collapse in the area;

(A-3) instructing arrangement of a search robot 105;

(A-4) two-way communication relay with a search robot 105 and base station 100; and (A-5) power supply to a search robot 105.

Specifically, mother robot 104 divides the entire area of disaster into a mesh cell 106 of an appropriate size. One search robot 105 is arranged in each mesh cell. The interior of an obstacle 102 cannot be observed from mother robot 104. Therefore, the boundary of a range of search is defined to determine mesh cell 106. By dividing the search region into one or a plurality of mesh cells 106 in which a search robot 105 is disposed, the area of search such as the region of disaster can be surveyed all over to identify the position of a casualty 103 accurately to develop efficient rescue activities. The search activity can be implemented with an economic and compact robot. The robot can travel through small openings in obstacle 102 to search over a large area.

By dividing the search region into mesh cells 106, the outermost mesh cell 107 that can be observed from mother robot 104 is determined. Mother robot 104 first dispatches (arranges) a search robot 105 in this outermost mesh cell 107. Since outermost mesh cell 107 can be observed from mother robot 104, a search robot 105 can be arranged positively. Also, communication between mother robot 104 and search robot 105 can be ensured. FIG. 1 represents a search method of the search robot system at the initial stage of search. Specifically, FIG. 1 corresponds to a search method in which thirteen search robots 105 initiate the work operation at outermost mesh cells 107.

Search robot 105 travels along the surface of obstacle 102 while searching for:

(B-1) whether there is a casualty 103 or not; and (B-2) whether there is a route to move to an adjacent mesh cell 108.

Since casualty 103 to be searched for is in contact with obstacle 102, all the points in the space coordinates do not have to be searched. During travel, search robot 105 must circumvent any obstruction. Therefore, search robot 105 preferably detects an object to be circumvented, i.e., an obstacle 102, by means of a sonar or an infrared ray, to move along the surface of obstacle. Through this manner of travel by search robot 105, a casualty 103 lying down in contact with or leaning against obstacle 102 can be found efficiently. A casualty 103 can be searched for in a non-contacting manner.

As a result of search robot 105 detecting an obstacle 102 through a sonar or an infrared ray and mapping the interior of mesh cell 106, the map can be referenced to when search robot 105 has to confirm its own position coordinates. Thus, positioning of higher accuracy is allowed.

The infrared sensor can detect the physical quantity important to identify a casualty 103 such as the body heat of casualty 103 to be searched for. A sonar can detect the physical quantity important to identify a casualty 103 such as the respiratory sound, voice, and the like of casualty 103. The infrared sensor and sonar are very effective since a casualty 103 can be searched for even in places where the view is not good such as during night time or in the dark or filled with smoke.

Although the above description is based on the case where an obstacle 102 is detected by means of a sonar or infrared ray, it will be understood that such description is merely exemplary, and any sensor that can detect the surface of an obstacle 102 may be used.

Search robot 105 preferably includes an acceleration sensor and an angular acceleration sensor. This allows search robot 105 to identify its own position accurately.

Although search robot 105 conducts mapping of mesh cell 106 using its own sensor or the like, mapping of mesh cell 106 can also be realized through communication with mother robot 104 or base station 100. As a result of search robot 105 conducting mapping based on search information from mother robot 104 or base station 100, the status of search can be recorded accurately to identify an area not yet searched.

Alternatively, search robot 105 can determine its own position through a GPS (Global Positioning System) or the like, without the aid of mother robot 104. Accordingly, search robot 105 can identify its own absolute position globally. Furthermore, the position relationship between search robots 105 can be compared readily. However, it is to be noted that there is a disadvantage of the activity being degraded if communication through the GPS is disrupted.

In order to conduct the above (B-1) and (B-2), search robot 105 includes:

(a) an infrared sensor to sense the body of a human being or the like;

(b) a vital sensor to sense heart sounds or the like;

(c) an input/output device of audio or voice to inform the presence of search robot 105 or converse with operator 101;

(d) a sonar and/or a CCD (Charge Coupled Device) apparatus to sense an obstruction;

(e) a mapping function to thoroughly search in the area of mesh cell 106;

(f) a communication device to inform mother robot 104 the sensed information and/or its own coordinates in the mesh cell, as well as receiving an instruction from mother robot 104; and (g) a power send/receive apparatus to receive power from mother robot 104 or another search robot 105, or supply power to another search robot 105. Additionally, other structural elements may be included.

There are cases where it may be difficult to discriminate between a living being and an inanimate matter by just the means of an infrared sensor (a) in finding a casualty. It is therefore desirable that search robot 105 or operator 101 determines the presence of a casualty 103 in a comprehensive manner through the additional usage of a vital sensor (b) and an input/output apparatus (c).

Casualty 103 can also be informed of the presence of search robot 105 by means of input/output device (c). This is effective from the standpoint of eliminating the necessity of a casualty 103 feeling alarmed.

Search robot 105 immediately contacts mother robot 104 through a communication device (f) or the like when a casualty 103 is found. Mother robot 104 then informs base station 100. When search robot 105 cannot communicate directly with mother robot 104, mother robot 104 is informed through another search robot 105 located in an adjacent mesh cell 108. Upon being informed, operator 101 will promptly dispatch a rescue team to proceed with the rescue activity of casualty 103.

In this rescue, an appropriate route of rescue, i.e., the safest and shortest route to reach casualty 103, can be identified at base station 100 based on the most recent map of the area of disaster.

If the rescue team is provided with one search robot 105, mother robot 104 can identify the current position of the relevant rescue team through that search robot 105. Mother robot 104 can then inform another search robot 105 the route of rescue to casualty 103, whereby the rescue team can be guided to casualty 103.

When search robot 105 finds a route to an adjacent mesh cell 108 from outermost mesh cell 107 in which it was first allocated, mother robot 105 is notified of this route. Then, another search robot 105 to search in this adjacent mesh cell 108 is to be arranged. Alternatively, the former search robot 105 can initiate a search in adjacent mesh cell 108, leaving the search of the former mesh cell 107 to a new search robot 105. In this case, the former search robot 105 must transfer the map of mesh cell 107 to new search robot 105.

Thus, search robot 105 can sequentially open up a route to an inner mesh cell from the outer side mesh cell. The effective route for rescue can be identified at the time of finding a casualty.

The capability of search robot 105 moving to an adjacent mesh cell to continue the search is advantageous in cases where the number of search robots 105 is insufficient, the time required for another search robot 105 to arrive at a particular mesh cell is too long, and when the route is blocked.

Confirmation of the boundary of mesh cell 106 is preferably made in the communication with search robot 105 based on the mapping data of mother robot 104.

Although the search of an adjacent mesh cell may be conducted by the former search robot 105, it is to be noted that dispatching another search robot 105, if readily available, to carry out a search with more search robots 105 is advantageous in the case where there is no time to lose in the rescue activity. By using another new search robot 105 for the search in an inner mesh cell not in contact with the boundary of the search region, the rescue activity can be carried out effectively through a plurality of robots in the matter of urgency. At sites where radio waves cannot be propagated, communication as well as power supply can be effected through a search robot of an adjacent mesh cell.

Eventually, all the regions of mesh cells 106, 107 and 108 have a search robot 105 arranged therein. The work operation is completed when the search in respective mesh cells 106, 107 and 108 ends.

There may be places where search robot 105 could not enter due to the enclosure of obstacle 102. In this case, obstacle 102 must be removed to conduct a search. Although search robot 105 of the present invention is not particularly fit for such work of removal, search robot 105 is extremely advantageous in that the necessary site can be located.

It is necessary to identify whether the place where search robot 105 could not enter corresponds to a mass of concrete or the like or a cavity with the possibility of a casualty 103 being present. One may consider that it is not necessary to conduct a search if the place is so small that there is no possibility of a casualty 103 being present therein. However, it is preferable to confirm whether the place includes a cavity or not since there is the possibility of a small child or a pet animal being present therein.

In this case, operator 101 can determine the configuration and the like of such a cavity. Also, search robot 105 can be made to land on the surface of the obstacle to examine the interior through a sonar. Search robot 105 can detect whether there is a cavity in obstacle 102 in which a search is to be conducted based on the sonar information obtained from the surface of obstacle 102. By locating a place where entry is not allowed, identification can be made between a region already searched and a region where a search cannot be conducted.

In the above search task, a search robot 105 that has completed its work operation earlier than another search robot 105 performs:

(C-1) a process of conducting a search in the remaining mesh cell when a route to the remaining mesh cell is developed;

(C-2) a process of conducting communication relay for another search robot 105 that cannot directly communicate with mother robot 104; and (C-3) a process of conducting power relay for another search robot 105 that cannot directly accept power from mother robot 104.

In the above processes of (C-2) and (C-3), mother robot 104 preferably sets search robot 105 to land on the surface of obstacle 102 to minimize consumption of the battery.

In the actual scene of disaster, the state of the obstructions may change as a result of collapse or in the course of manual rescue activities. There are also the cases where search robot 105 can move no longer, or is damaged to disallow continuing a search in the mesh cell. There is also the case where search robot 105 can no longer communicate with an outer source, losing its identification of location. To this end, mother robot 104 constantly monitors such change, and:

(D-1) instructs search robot 105 to search again;

(D-2) arrange a new search robot 105 in a new mesh cell; and (D-3) arrange a new search robot 105 as a substitute of a search robot 105 that can no longer conduct a search, as necessary.

When the battery of search robot 105 has run out, search robot 105 request mother robot 104, another search robot 105 nearby, or base station 100 for power supply, and receives charge. Alternatively, search robot 105 returns back to a predetermined site to be charged.

By the above-described search through a search robot system of the present embodiment, communication and power supply between a search robot and an external source can be relayed. Information of the change in the status of the area of disaster that can only be identified from outside can be transmitted to a search robot. Also, information that cannot be processed by a compact search robot alone can be analyzed. Furthermore, information can be relayed to an external base station to conduct the work operation in an appropriate manner.

The search robot system of the present embodiment can derive and evaluate the optimum route of rescue based on a map generated through the search activity. Thus, a search can be conducted efficiently.

By a search employing the above-described search robot in the search robot system of the present embodiment, a casualty who is alive can be identified more quickly. Also, identification of a human being or an animal such as a pet can be made. Furthermore, information required for identification can be communicated to an external source to allow identification of the status of a casualty from an external source.

The type of mother robot 104 is not limited to the above-described balloon type robot, and a fluttering type robot or a helicopter type robot can be employed.

By the flying capability of mother robot 104, mother robot 104 can identify the status of the area of disaster from the sky or from the side to provide appropriate information to search robot 105 or base station 100.

Mother robot 104 does not necessarily have to be a flying robot as long as it achieves an entire view of the area of disaster. For example, mother robot 104 may be disposed at an adjacent building or the like.

Search robot 105 is not limited to a fluttering type robot. It may be of any type as long as it can advance while circumventing an obstacle 102, such as a balloon type robot, a helicopter type robot, a ground travel robot with a caterpillar or cupule, or a wired robot by means of fiber and the like. It is to be noted that an obstacle 102 can be bypassed extremely readily by means of a flying robot.

Thus, the flying capability of search robot 105 is advantageous in that search robot 105 can enter the interior of an obstacle 102 as long as there is an opening of a size that allows passage of search robot 105, and that a search can be conducted of the surface in a non-contacting manner.

Search robot 105 will be described hereinafter, corresponding to a fluttering robot.

Figure 2:
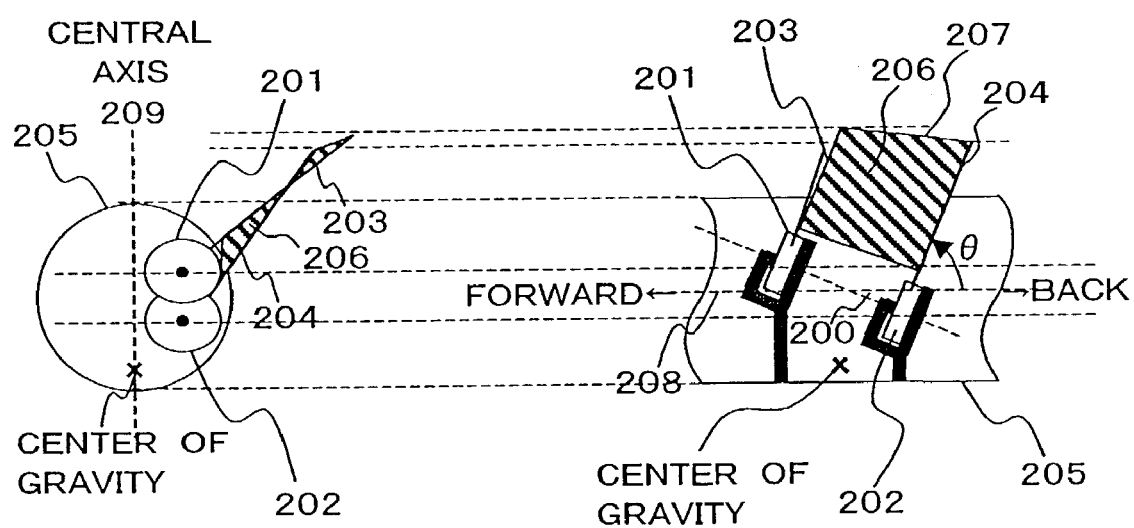
FIG. 2 schematically shows a fluttering apparatus of a search robot 105 according to an embodiment of the present invention.

FIG. 2 shows a schematic view of a fluttering apparatus of search robot 105 of the present embodiment. The left side of FIG. 2 shows the front portion of the fluttering apparatus, whereas the right side of FIG. 2 shows the left side portion of the fluttering apparatus from the front view. FIG. 2 depicts only the left wing towards the front view of the fluttering apparatus. In practice, a right wing is also provided symmetrically about a central axis 209 of a body 205. For the sake of simplification, it is assumed that the axis (body axis 208) along the extending direction of body 205 is in the horizontal plane, whereas central axis 209 passing through the center of gravity is maintained perpendicularly.

Referring to FIG. 2, body 205 of the fluttering apparatus is provided with a wing (left wing) including a front wing shaft 203, a rear wing shaft 204, and a wing film 206 spread so as to bridge across front wing shaft 203 and rear wing shaft 204.

Body 205 includes a rotational actuator 201 to drive front wing shaft 203, and a rotational actuator 202 to drive rear wing shaft 204. The arrangement of actuators 201 and 202, and the configuration of the wing including front wing shaft 203, rear wing shaft 204 and wing film 206 are not limited to those shown in FIG. 2 as long as the flight performance is not degraded.

By configuring the cross sectional shape of the wing in a convex manner upwards vertically in the present fluttering apparatus, a lift force is generated in addition to a drag in the flight in the horizontal direction, leading to greater elevation.

The position of the center of gravity of the fluttering apparatus is set so that the force received at the wing through the environmental fluid is located lower than the acting position (point of application) on actuators 201 and 202 from the standpoint of stability of the fluttering apparatus. However, the center of gravity is preferably set substantially matching the point of application in order to readily modify the attitude of the fluttering apparatus. In this case, the difference in force received on the left and right wings from the fluid, required for attitude control, becomes smaller to facilitate attitude modification of the fluttering apparatus.

The two rotational actuators 201 and 202 share a rotational axis 200 (the axis passing through the fixed points of rotational actuators 201 and 202). Rotational axis 200 and body axis 208 form a predetermined angle (90°-θ). Front wing shaft 203 and rear wing shaft 204 reciprocate within a plane orthogonal to rotational axis 200 with rotational actuators 201 and 202 as the fulcrum. The angle of the plane orthogonal to rotational axis 200 to body axis 208 forms an elevation angle θ.

To achieve reliable mechanical strength and sufficient light weight, body 205 is preferably constructed from polyethylene terephthalate (PET), molded to a cylindrical configuration. However, the material and configuration are not limited thereto.

In the fluttering apparatus of FIG. 2, rotational actuator 201 and rotational actuator 202 are connected to a front wing shaft 203 and a rear wing shaft 204, respectively.

A wing film 206 is spread across front and rear wing shafts 203 and 204. Wing film 206 has an autonomous tension in a shrinking direction in plane to serve to improve the rigidity of the entire wing.

To reduce weight, front and rear wing shafts 203 and 204 have a hollow structure, and are formed of carbon graphite. Accordingly, front and rear wing shafts 203 and 204 have elasticity, deformable through the tension of wing film 206.

Search robot 105 of the present embodiment is a fluttering robot, i.e., a flapping-wing robot including the above-described fluttering apparatus. A fluttering robot corresponding to search robot 105 of the present embodiment will be described hereinafter.

Figure 3:
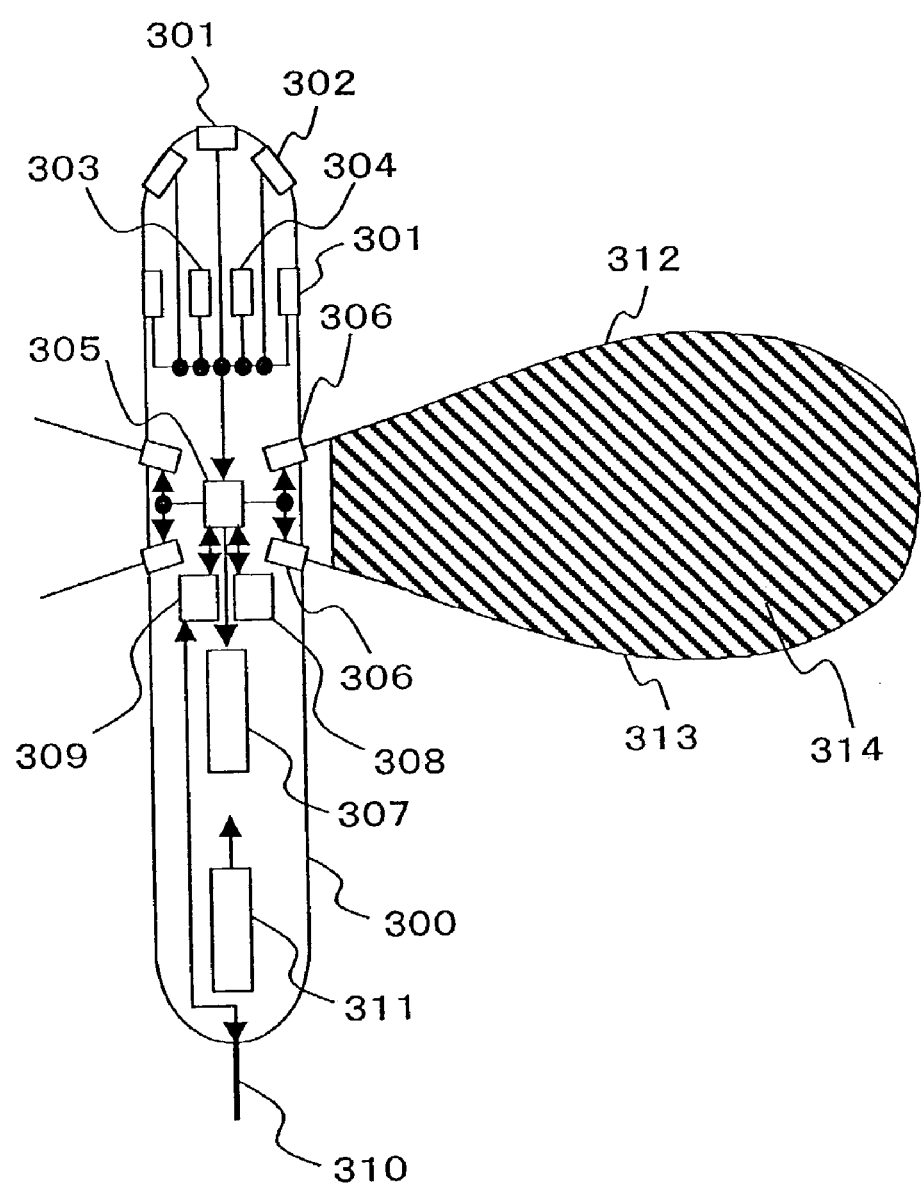
FIG. 3 shows an entire configuration of a fluttering robot employed as a search robot.

FIG. 3 represents an entire configuration of a fluttering robot employed as a search robot. For the sake of convenience, the left part wing to the front direction (upwards in the sheet plane) is not depicted.

Referring to FIG. 3, an ultrasonic sensor 301, an infrared sensor 302, an acceleration sensor 303, and an angular acceleration sensor 304 are arranged at a body 300 of the fluttering robot.

The detected results of sensors 301–304 are transmitted to a fluttering control unit 305. Fluttering control unit 305 processes information such as the distance between the present fluttering robot and an obstacle or a human being in the neighborhood from the detected outputs of ultrasonic sensor 301 and infrared sensor 302. Fluttering control unit 305 processes information such as the aloft status, the position of destination, attitude and the like of the present fluttering robot from the detected results of acceleration sensor 303 and angular acceleration sensor 304 to determine the drive control of left and right actuators 306 and a center of gravity control unit 307.

In the present embodiment, ultrasonic sensor 301 and infrared sensor 302 are employed as the means for detecting an obstacle located in the neighborhood of the present fluttering robot, whereas acceleration sensor 303 and angular acceleration sensor 304 are employed as the means for detecting the position and attitude of the present fluttering robot. However, the present invention is not limited to such sensors, and any sensor that can measure the neighborhood environment, location, and attitude of the present fluttering robot may be employed.

For example, the attitude of the present fluttering robot can be calculated from the acceleration information obtained by two acceleration sensors disposed at different locations of body 300, which can measure the acceleration in triaxial directions that are orthogonal. Also, the location and attitude of the present fluttering robot can be calculated by sensing the magnetic field distribution through a sensor.

Although the sensors such as acceleration sensor 303 and angular acceleration sensor 304 are depicted as discrete components apart from fluttering control unit 305, these sensors may be formed on the same substrate as a unitary element with fluttering control unit 305 by, for example, micromachining, from the standpoint of reducing the weight.

The present fluttering robot has the wing driven under open-loop control. Alternatively, a wing angle sensor may be provided at the root of the wing to effect closed-loop control based on angle information obtained from the angle sensor.

If the flow of the fluid in the environment of flying is known and lifting is allowed by a predetermined wing-drive mechanism, the sensors cited herein are dispensable.

Fluttering control unit 305 is connected with a memory 308 from which existing data required for fluttering control is read out. Fluttering control unit 305 transfers information obtained from respective sensors 301–304 to memory 308, and rewrites information therein, as necessary. Therefore, the fluttering robot can be provided with a learning capability.

If only storage of information obtained through respective sensors 301–304 is required, direct connection may be established between memory 308 and each of sensors 301–304 without the intervention of fluttering control unit 305.

Fluttering control unit 305 is connected with a communication control unit 309 to output/input data to/from communication control unit 309. Communication control unit 309 transfers data with an external apparatus (another fluttering robot 105, mother robot 104, base station 100, or the like) via an antenna unit 310.

By such communication capability, the present search system can promptly transfer to an external apparatus the data obtained by fluttering robot 105 and stored in memory 308. By receiving information from an external apparatus that cannot be obtained through the fluttering robot and storing such information in memory 308, appropriate information can be used for fluttering control. For example, the entire map information of the entire area of disaster does not have to be stored in a fluttering robot. Only the required information can be received appropriately. Also, mapping information, searching results, and the like in a search mesh cell can be output to mother robot 104 and base station 100.

Furthermore, power can be delivered through radio waves.

Antenna unit 310 of FIG. 3 has a rod configuration protruding from an end of body 300. The configuration, disposition, and the like are not limited thereto, as long as the antenna performance is maintained. For example, a loop antenna may be formed on the wing using front and rear wing shafts 312 and 313. Furthermore, antenna unit 310 may be built in body 300, or formed as a unitary element with communication control unit 309.

These ultrasonic sensor 301, infrared sensor 302, acceleration sensor 303, angular acceleration sensor 304, fluttering control unit 305, left and right actuator 306, center of gravity control unit 307, memory 308, communication control unit 309, antenna unit 310, and the like are driven by current supplied from a power source 311.

Although electric power is employed as the driving energy, internal combustion may also be used. Also, an actuator utilizing physiological oxidation-reduction reaction as seen in the muscle of an insect may be used. Alternatively, the method of obtaining energy for driving the actuator from an external source is allowed. For example, a therminoic element, an electromagnetic wave, or the like may be employed for the electric power.

Next, a lifting method of search robot 105 according to the present embodiment corresponding to the above-described fluttering robot will be described.

For the sake of simplification, it is assumed that the external force acting on the present fluttering robot includes only the fluid force received on the wing from the fluid and the gravity acting on the fluttering robot (the product of the mass of the fluttering robot and the gravitational acceleration).

For the present fluttering robot to be kept aloft in a steady state, the relationship of:

(vertically upward fluid force acting on wing)>(gravity acting on fluttering robot)

must be satisfied in the time average of one fluttering motion. One fluttering motion refers to a downstroke and the next upstroke of the wing.

If the fluttering robot is to elevate exceeding the vertically upward fluid force, the following relationship must be satisfied:

(vertically upward fluid force acting on wing in downstroke movement)>(vertically downward fluid force acting on wing in upstroke movement).

A method of rendering the vertical upward fluid force acting on the wing in a downstroke motion (referred to as "fluid force in downstroke" hereinafter) larger than the vertically downward fluid force acting on the wing in an upstroke motion (referred to as "fluid force in upstroke" hereinafter), corresponding to a simplification of the flapping-wing flight of an insect, will be described hereinafter.

For the sake of simplification, the behavior of fluid or the force of the fluid on the wing will be described with reference to main components thereof. The level of degree between the lifting force obtained by the present fluttering method and the gravity acting on the present fluttering robot (referred to as "weight" hereinafter) will be described afterwards.

In order to set the fluid force in downstroke larger than the fluid force in upstroke in the fluttering robot of FIG. 2, the downward stroke should be effected so that the volume of the area through which wing film 206 travels is maximum. To this end, wing film 206 is to travel downwards substantially parallel to the horizontal plane. Accordingly, a fluid force of approximately the maximum level can be obtained.

In contrast, in an upstroke movement, the wing is to move so that wing film 206 travels through the smallest volume area. To this end, wing film 206 is to be moved upwards substantially at a right angle to the horizontal plane. Accordingly, the fluid force exerted on the wing is substantially minimized.

Figure 4:
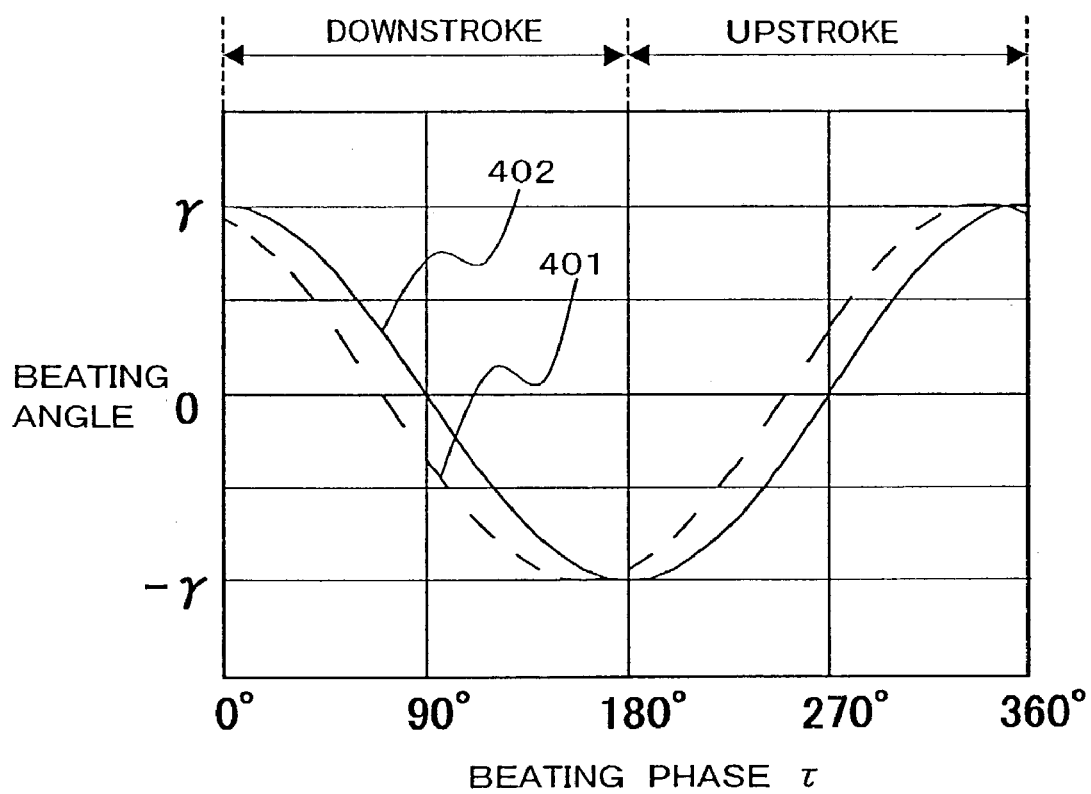
FIG. 4 shows the relationship between a fluttering motion and a phase of the fluttering motion.

In the present specification, the fluttering movement includes the reciprocation of both wing shafts 203 and 204 around rotational axis 200 by means of rotational actuators 201 and 202. It is assumed that each of wing shafts 203 and 204 is moved upwards and downwards by an angle of $\gamma$ about a position substantially matching the horizontal plane in the reciprocating motion. In order to satisfy the above conditions in the reciprocating motion, rear wing shaft 204 is delayed by an appropriate phase of $\phi$ with respect to the reciprocating motion of front wing shaft 203 as shown in FIG. 4. FIG. 4 shows the relationship between the fluttering motion and the phase of the fluttering motion.

Figure 5:
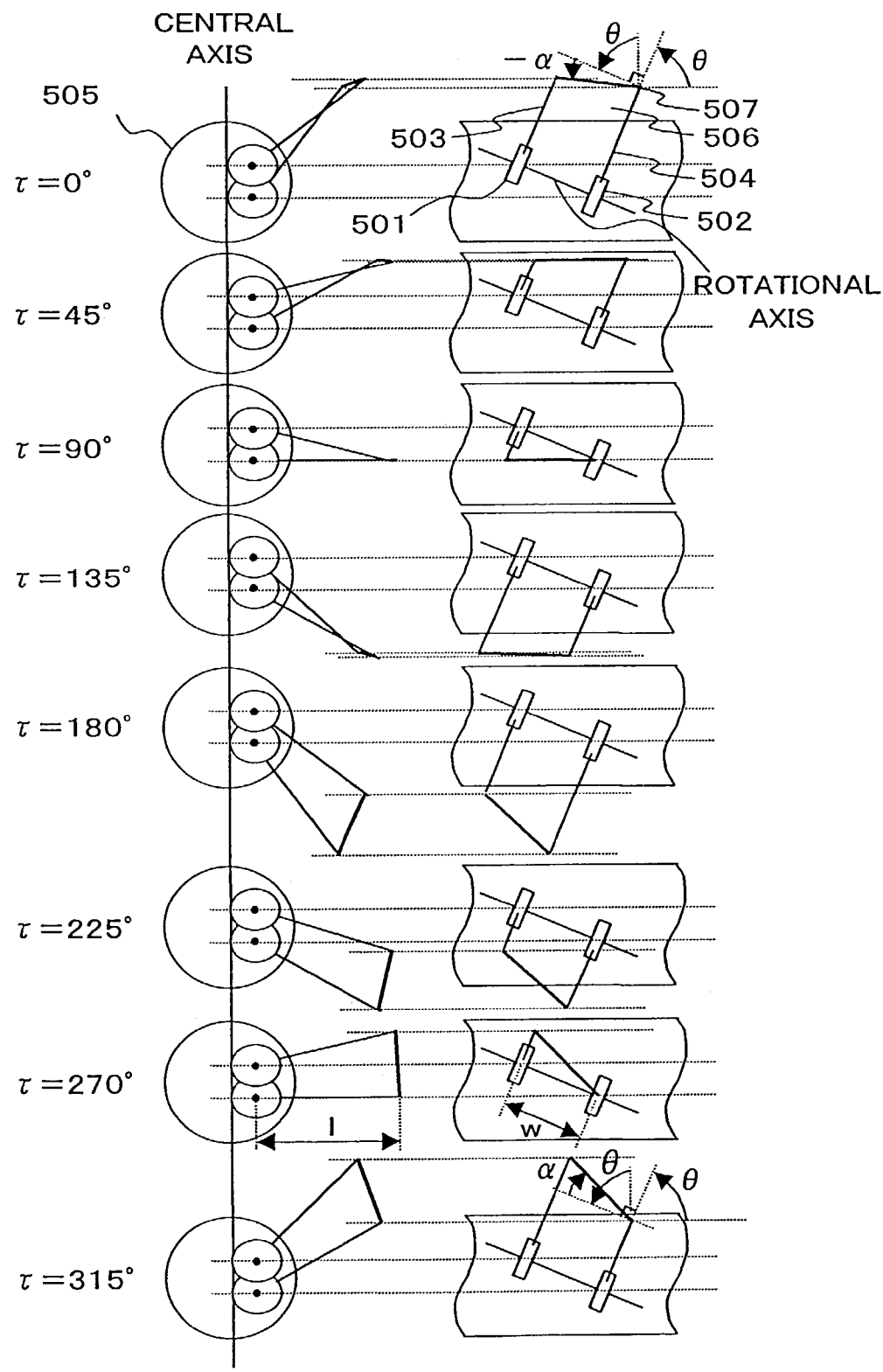
FIG. 5 shows respective states of a fluttering motion in a fluttering apparatus.

FIG. 5 shows respective states of the fluttering movement in a fluttering apparatus, where the aforementioned phase difference $\phi$ is set to 20°.

Referring to FIG. 5, in a downstroke represented by $\tau=0°-180°$ through the fluttering movement shown in FIG. 4, front wing shaft 503 of rotation actuator 501 at a higher site is first move downwards. Therefore, the leading edges of front and rear wing shafts 503 and 504 and wing film 506 approach horizontal. In an upstroke represented by $\tau=180°-315°$, the difference in height between the leading edges of wing shafts 503 and 504 increases, and wing film 506 approaches vertical.

As a result, the amount of fluid pushed downwards or upwards by wing film 506 spread across front and rear wing shafts 503 and 504 exhibits difference. Since the fluid force in downstroke is greater than the fluid force in upstroke, the lifting force of the fluttering robot is developed.

The vector of this lifting force inclines frontward and backward by altering the phase difference $\phi$. Forward inclination corresponds to a thrust movement, backward inclination corresponds to a retreating movement, and the direction right above corresponds to a hovering state. In actual flight, the fluttering frequency f or fluttering angle $\gamma$ can be controlled in addition to phase difference $\phi$. Although the fluttering elevation angle $\theta$ is fixed in the present fluttering robot, a mechanism to alter this angle may be provided to increase the degree of freedom.

The actual fluttering control will be described in further detail hereinafter.

In a downstroke or upstroke motion in the above-described fluttering robot, the torsional angle $\alpha$ by the leading edge of the wing is substantially represented by the following equation:

$$\tan\alpha = (w/l)\cdot\{\sin(\gamma\cdot\cos\tau) - \sin(\gamma\cdot\cos(\tau+\phi))\}$$

where l is the wing length (the length along the front and back wing shafts of the wing film), w is the wing width (the distance between the front wing shaft and back wing shaft), $\gamma$ is the fluttering angle, $\tau$ is the phase of the fluttering motion (the moment of the highest stroke being 0°, and the moment of the lowest downstroke being 180°), and $\phi$ is the phase difference between the front and rear wing shafts (refer to FIG. 4).

In practice, the front and rear wing shafts have elasticity, and are deformable. Therefore, torsional angle $\alpha$ may slightly vary. The value of torsional angle $\alpha$ becomes smaller as approaching the root of the wing shaft. For the sake of convenience, torsion angle $\alpha$ will be described in accordance with "$\alpha$" in the above equation.

Vertical component F of the fluid force acting on a wing absent of torsion is substantially represented as:

$$F = (4/3)\cdot\pi^2\rho w \gamma^2 f^2 l^3 \cdot \sin^2\tau \cdot \cos(\gamma\cdot\cos\tau)$$

where $\rho$ is the fluid density, $\gamma$ is the fluttering angle, and f is the fluttering frequency. It is to be noted that the horizontal component of the fluid force acting on the wing will be canceled by the other of the left and right wings, when the left and right wings take the same movement.

When the wing has a torsion angle $\alpha$, components L and D which are vertical and horizontal, respectively, to the plane of the fluttering motion of the above component F are represented by the following expressions:

$$L = F\cdot\cos\alpha\cdot\sin\alpha$$

$$D = F\cdot\cos^2\alpha$$

Taking into account the fluttering elevation angle θ, vertical component A corresponding to weight, and horizontal component J corresponding to the thrust of frontward/backward motion are represented as follows:

In downstroke, $A(\text{Down}) = -L \cdot \cos \theta + D \cdot \sin \theta$ $J(\text{Down}) = -L \cdot \sin \theta - D \cdot \cos \theta$ In upstroke, $A(\text{Up}) = L \cdot \cos \theta - D \cdot \sin \theta$ $J(\text{Up}) = L \cdot \sin \theta + D \cdot \cos \theta$ The actual lifting force and thrust are given as an integration of one cycle of a fluttering motion.

By way of example, specific numeric values in flight control based on the above equations will be indicated hereinafter.

Figure 6:
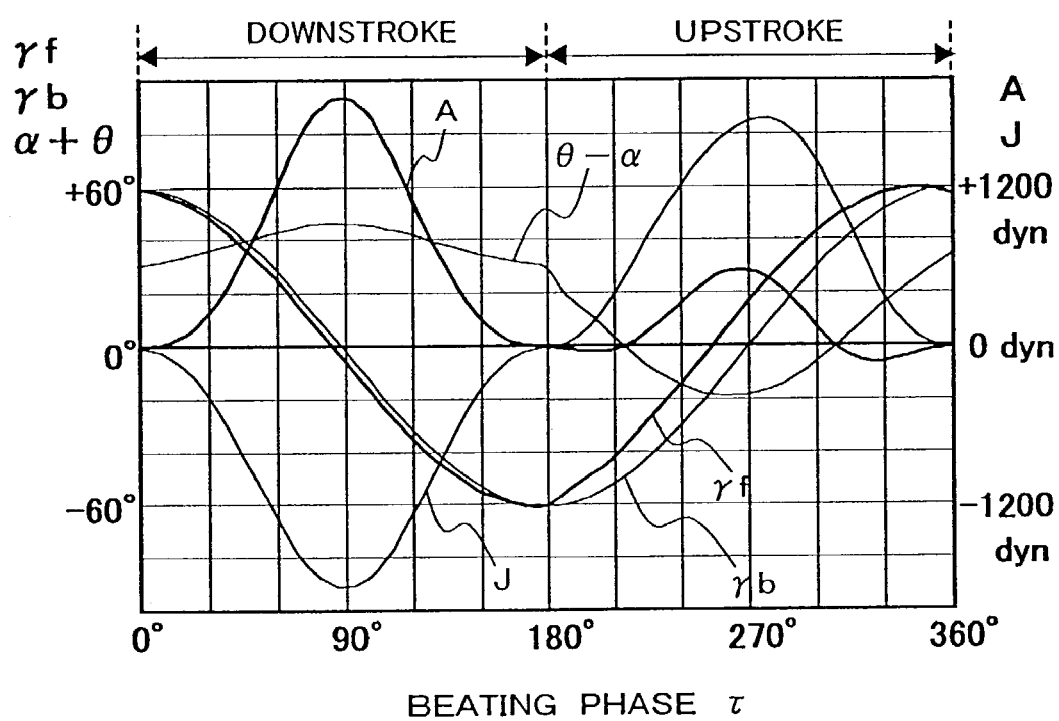
FIGS. 6 and 7 are first and second diagrams, respectively, representing the change of the force acting on a wing and respective angles with respect to the phase of a fluttering motion.

Consider the case where the length l of the wing of the fluttering robot is 4 cm, the width w of the wing is 1 cm, the fluttering elevation angle θ is 30°, the fluttering angle γ is 60°, the fluttering frequency f is 50 Hz, the downstroke phase difference φ is 4° C., and the upstroke phase difference φ is 16°. The changes over time of vertical component A and horizontal component J are shown in FIG. 6 together with the changes of respective angles over time. FIG. 6 is a first diagram representing the change in the force acting on the wing and respective angles with respect to the phase of the fluttering motion.

In FIG. 6, the period of time of one cycle is represented in phase τ along the abscissa. The former half represents a downstroke, whereas the latter half represents an upstroke.

The curves in the graph represent changes over time of the front wing shaft angle γf, the rear wing shaft fluttering angle γb torsional angle (θ−α) of the wing from a horizontal plane, vertical component A of the fluid force, and horizontal component J of the fluid force.

In this example, vertical component A of the fluid force per unit time is greater in downstroke than in upstroke. Therefore, a vertically upward fluid force of approximately 500 dyn is developed by one wing, as an average for one cycle. This means that, in the case where the fluttering robot is provided with two wings, the fluttering robot can be lifted if the weight of the fluttering robot is not more than approximately 1 g. Since horizontal component J of the fluid force per unit time is substantially canceled during one cycle, a fluttering robot of approximately 1 g in weight can attain a hovering state.

If the phase difference φ in downstroke is increased, or if the phase difference φ in upstroke is reduced, the fluttering robot can move forward. In this operation, frequency f is preferably set slightly smaller for the purpose of horizontal advance. In contrast, if the phase difference φ in downstroke or the phase difference φ in upstroke is increased, the fluttering robot can move backwards. In this operation, frequency f is preferably set larger for a horizontal retreat movement.

The present fluttering robot can move horizontally forward at the speed of 1 m during the initial one second by increasing the phase difference φ of downstroke to 7° while maintaining the phase difference φ of upstroke at 16°, or by reducing the phase difference φ in upstroke to 11° while maintaining the phase difference φ in downstroke at 4° with the fluttering frequency f decreased to 48 Hz.

Also, the present fluttering robot can move backwards horizontally at the speed of approximately 1 m during the initial one period by reducing the downstroke phase difference φ to 1° while maintaining the upstroke phase difference φ (up) to 16°, or increasing the upstroke phase difference φ (up) to 24° while maintaining the downstroke phase difference φ (down) at 4° with the fluttering frequency f increased to 54 Hz.

In order for the fluttering robot to ascend or descend while maintaining a hovering state, frequency f is to be increased or decreased.

In order to gain or lose altitude during horizontal flight, control is allowed mainly through frequency f. The fluttering robot ascends by increasing frequency f and descends by reducing frequency f, respectively.

In this example, the torsional angle α of the wing is gradually altered during an upstroke or downstroke motion. This is to reduce the load on the actuator. As a fluttering motion to develop lifting, torsional angle α may be altered abruptly at the transition from a downstroke movement to an upstroke movement or from an upstroke movement to a downstroke movement with wing torsional angle α set at a constant value during the upstroke and downstroke movements.

Figure 7:
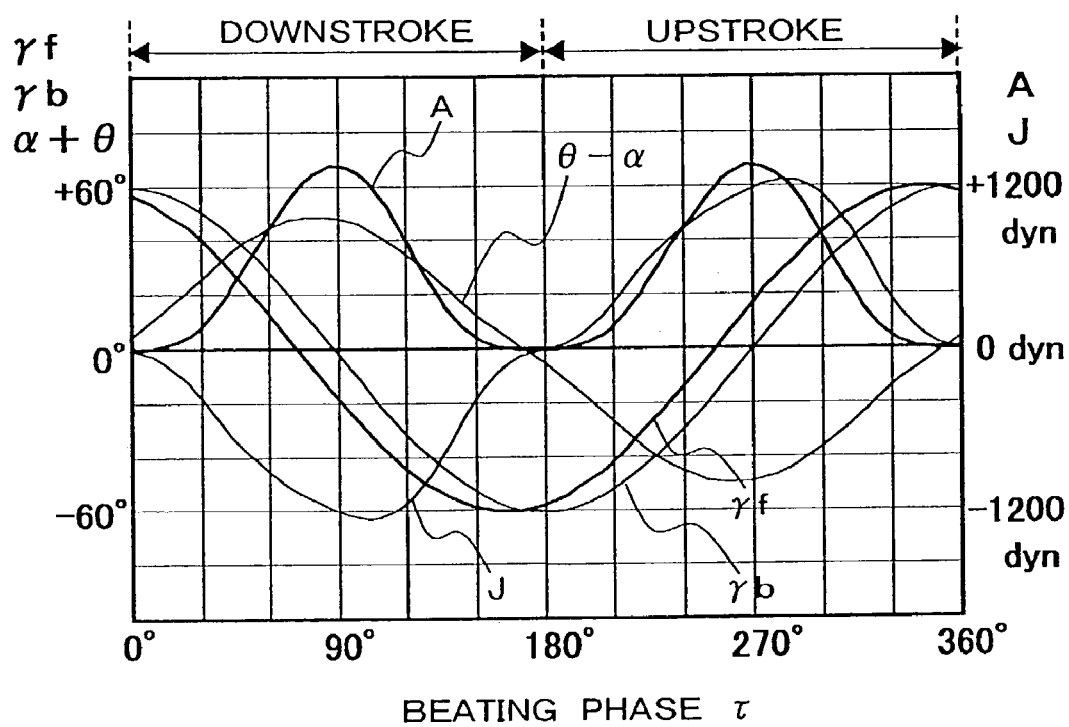

Changes over time of vertical component A and horizontal component J when fluttering elevation angle of the wing is set to θ=0° is represented in FIG. 7 together with changes over time of respective angles. FIG. 7 is a second diagram representing the change in the force acting on the wing and respective angles with respect to the phase in the fluttering motion.

The example of FIG. 7 corresponds to a fluttering motion conceived from the hovering motion of a humming bird. In the case where the fluttering motion of the left wing and the right wing can be controlled individually, steering to the left or to the right can be realized by generating a difference in the thrust by respective left and right wings. For example, when the fluttering robot is to turn to the right during a forward flying operation, the fluttering angle γ of the right wing is to be set smaller than that of the left wing, or the phase difference between the front wing shaft and the rear wing shaft of the right wing is to be set larger than that of the left wing. Alternatively, in the case where the fluttering elevation angle θ can be controlled, the fluttering elevation angle θ of the right wing is set smaller than the fluttering elevation angle θ of the left wing. Accordingly, the thrust of the right wing will become relatively lower than the thrust of the left wing, allowing the fluttering robot to turn to the right. Control in the opposite manner is to be conducted when the fluttering robot is to turn to the left.

Turning to the left or right is also possible by shifting the center of gravity of the fluttering robot to the left or right by means of center of gravity control unit 307 shown in FIG. 3.

For example, the fluttering robot can turn to the right by shifting the center of gravity to the right with the right wing and the left wings inclined downwards and upwards, respectively, and increasing frequency f. Conversely, the fluttering robot can turn to the left by shifting the center of gravity to the left, and similarly increasing frequency f. In either case, it is preferable to set frequency f of both the left and right wings at the same value to maintain a stable attitude.

The above description is based on the case where the plane of the reciprocation of front and rear wing shafts 203 and 204 is orthogonal to rotational axis 200. In this case, the plane of reciprocation of front wing shaft 203 and the plane of reciprocation of where wing shaft 204 are parallel to each other. As shown in FIG. 3, the plane of reciprocation of front wing shaft 203 and the plane of reciprocation of rear wing shaft 204 may be angled. This is advantageous in that the change of the wing torsional angle α from a positive value to a negative value or from a negative value to a positive value in the transition from an upstroke motion to a downstroke motion or from a downstroke motion to an upstroke motion is speeded by virtue of the elasticity of wing shafts 312 and 313 and the tension of wing film 314.

Figure 8:
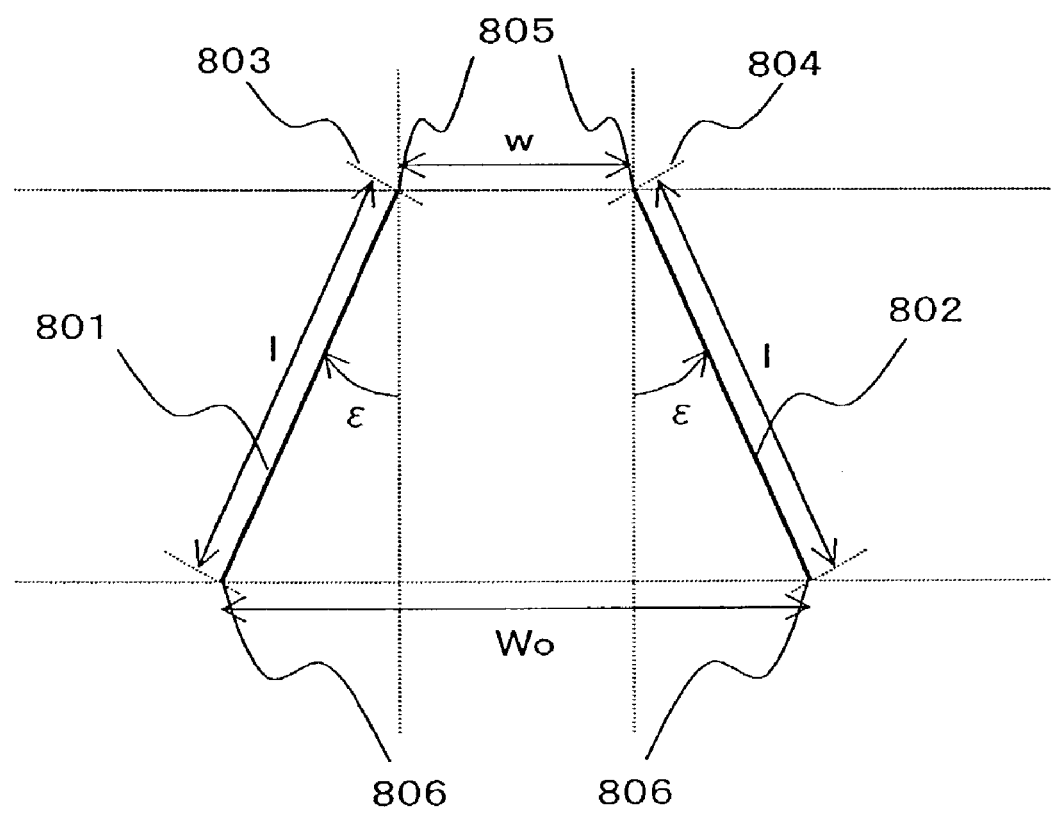
FIG. 8 represents the relationship between two wing shafts when the tip direction of a front wing shaft and a rear wing shaft are inclined outwards by an angle $\epsilon$ from a position parallel to each other.

FIG. 8 shows the relationship between two wing shafts in the case where the direction of the leading edges of the front and rear wing shafts are directed outwards by angle ε from the position parallel to each other.

Referring to FIG. 8, the distance Wo between the leading edges 806 of the wing shafts with wing torsional angle α=0° (γf=γb) exhibits the largest value when ε satisfies the expression of:

$$\sin \epsilon > \{(w^2+8 \cdot l^2)^{1/2} - w\}/4 \cdot l$$

where w is the width of root 805 of the wing shaft, and the l is the length of the wing shaft. Therefore, the elasticity of the wing shaft and the tension of the wing film exhibit maximum values thereat. The state of |α|>0 offers stability. Also, the change of torsional angle α can be increased in speed.

The value of ε satisfying the above expression is ε>30° when the wing aspect ratio Ap (l/w)=1, and ε>17.2° when Ap=4, and ε>11.5° when Ap=10.

By adding the degree of freedom of wing shafts 801 and 802 that can rotate about their axes, the load on the actuator can be alleviated to allow efficient control. Specifically, referring to FIG. 3 again, by adding the degree of freedom of wing shafts 312 and 313 that can be rotatable about the axis, rotation is allowed with the portion of wing film 314 fixed to wing shafts 312 and 313 substantially facing each other, even if the position relationship between wing shafts 312 and 313 is altered. Accordingly, the load on actuator 306 can be alleviated to allow efficient control.

Figure 9:
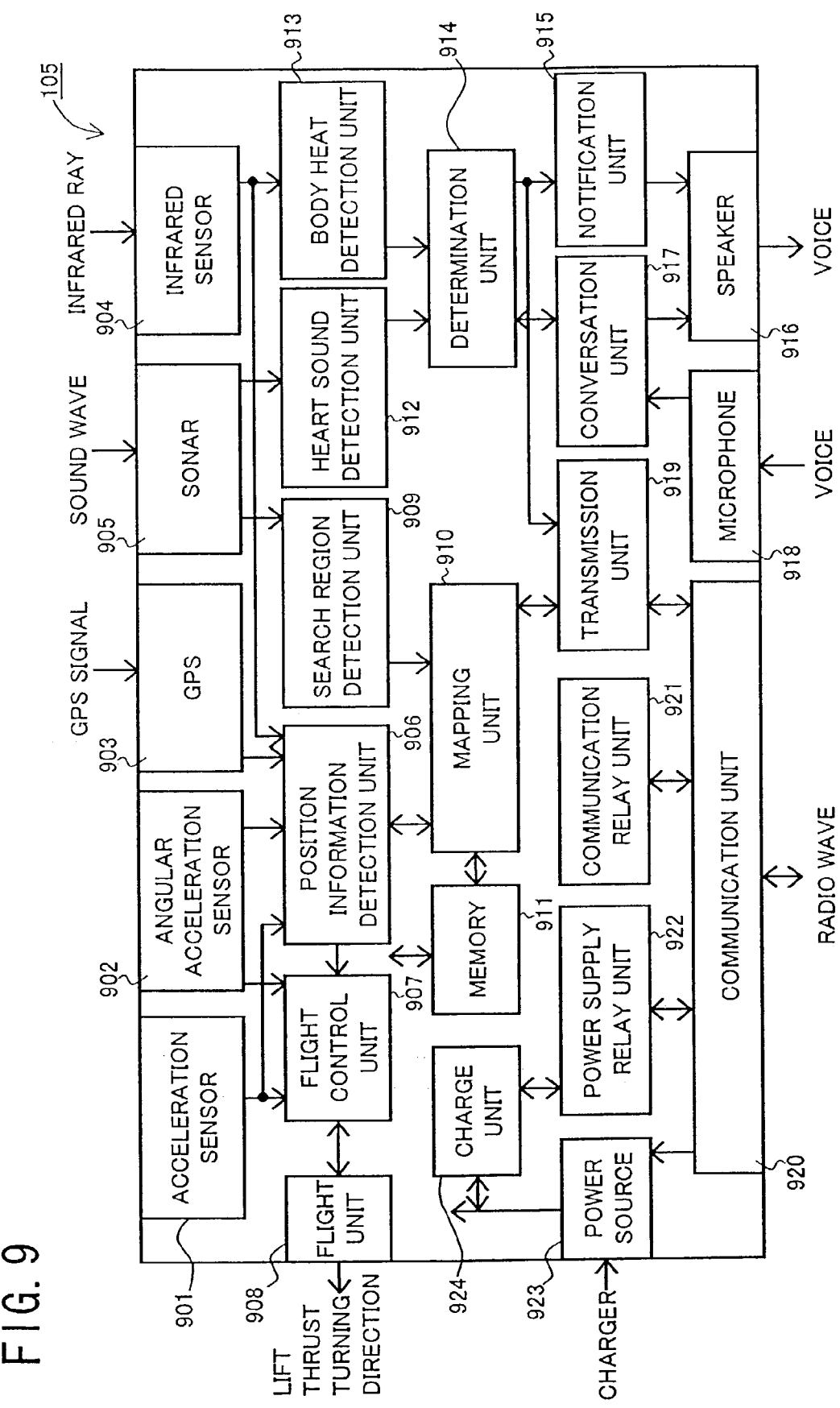
FIG. 9 represents a specific configuration of the functions of a search robot 105.
Figure 10:
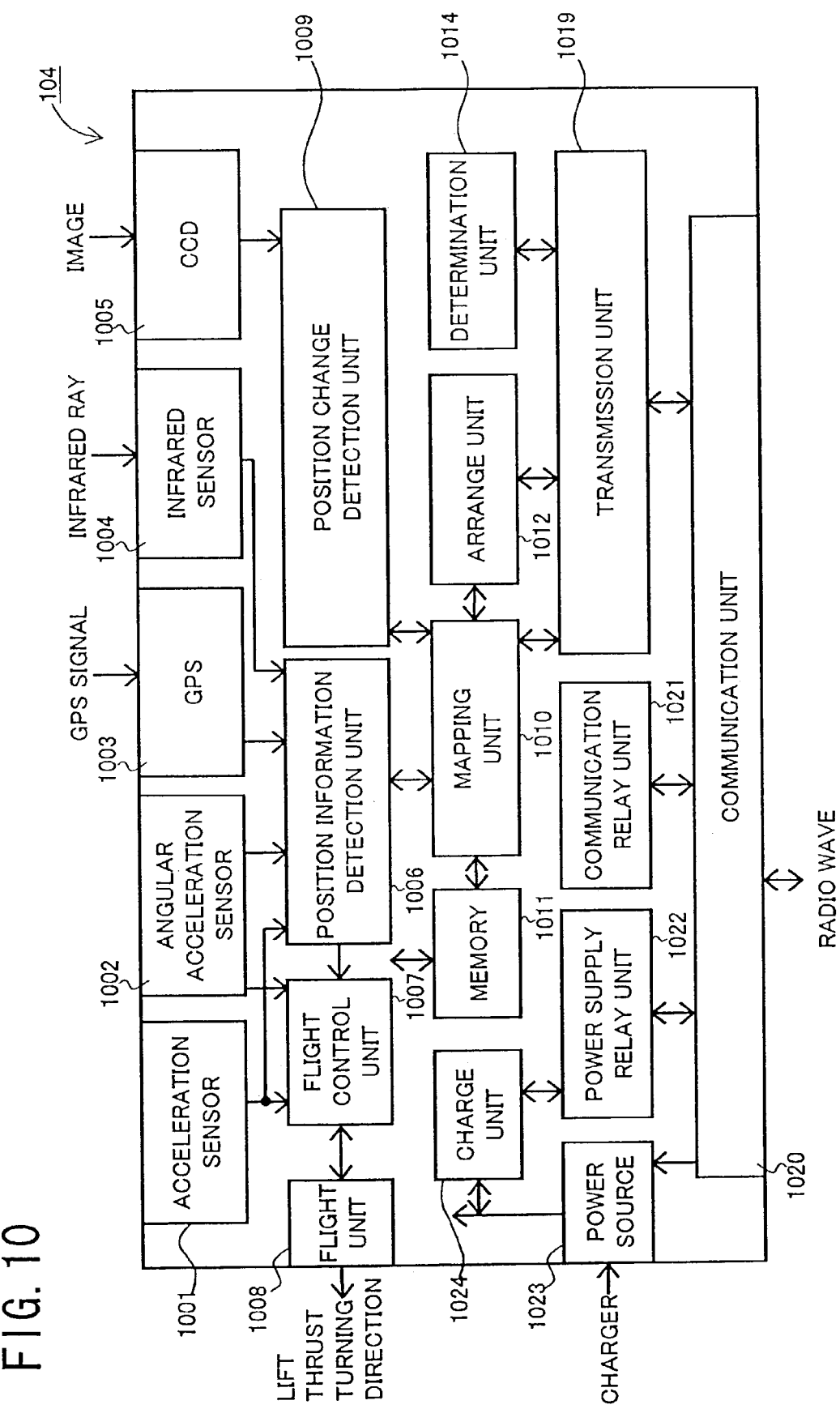
FIG. 10 represents a specific configuration of the functions of a mother robot 104.
Figure 11:
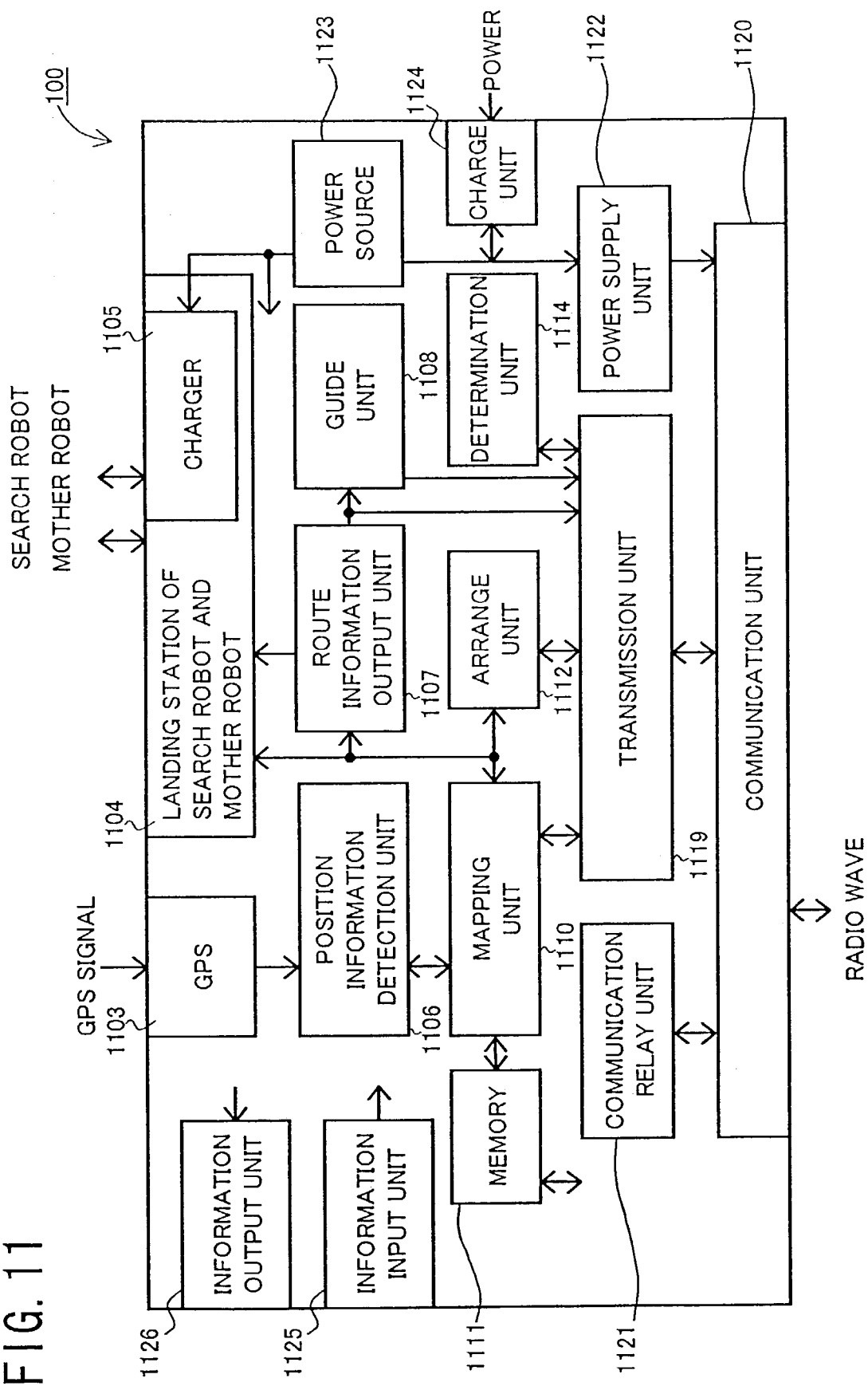
FIG. 11 represents a specific configuration of the functions of a base station 100.

The configuration of the functions of search robot 105, mother robot 104, and base station 100 to conduct the above-described search in a search robot system of the present invention will be described hereinafter with reference to FIGS. 9–11. FIGS. 9, 10, and 11 are block diagrams corresponding to search robot 105, mother robot 104, and base station 100, respectively.

Referring to FIG. 9, search robot 105 has power charged by a power source 923 from a charger 1105 (refer to FIG. 11) of base station 100 power to appropriate components, or a charge unit 924 of search robot 105. Charge unit 924 charges the power supplied from power source 923. Charge unit 924 receives through a power supply relay 922 the power received through radio waves at communication unit 920 from mother robot 104 or another search robot 105 for charging. Alternatively, charge unit 924 supplies the charged power to appropriate components of search robot 105, or supplies to another search robot 105 from communication unit 920 via power supply relay unit 922.

Communication unit 920 performs communication with mother robot 104, base station 100, or another search robot 105. Specifically, communication unit 920 receives an instruction signal indicating a mesh cell to be searched from mother robot 104, and applies an arrangement instruction signal to mapping unit 910 via transmission unit 919.

Referring to FIG. 9, search robot 105 includes an acceleration sensor 901 detecting acceleration, an angular acceleration sensor 902 detecting angular acceleration, a GPS 903 detecting a GPS signal, an infrared sensor 904 detecting an infrared ray, and a sonar 905 detecting a sound wave. Acceleration sensor 901 and angular acceleration sensor 902 apply the detected acceleration signals to position information detection unit 906 and flight control unit 907. GPS 903 applies a detected GPS signal to position information detection unit 906. Infrared sensor 904 applies a detected infrared signal to position information detection unit 906 and body heat detection unit 913. Sonar 905 applies a detected sound wave signal to search region detection unit 909 and heart sound detection unit 912.

Position information detection unit 906 detects the current position of relevant search robot 105 based on the acceleration signals supplied from acceleration sensor 901 and angular acceleration sensor 902, the GPS signal from GPS 903, the infrared signal from infrared sensor 904, and the sound wave signal from sonar 905. Position information detection unit 906 applies position information indicating the detected current position to mapping unit 910.

Mapping unit 910 produces mapping information of a mesh cell indicated by the instruction signal applied from communication unit 920 via transmission unit 919 based on the position information applied from position information detection unit 906 (this process is also called "mapping"). Mapping unit 910 stores the produced mapping information in memory 911. Mapping unit 910 applies the produced mapping information to communication unit 920 via transmission unit 919, and outputs the mapping information to mother robot 104. Mapping unit 910 detects a region not yet search within the mesh cell based on the produced mapping information.

Position information detection unit 906 obtains from mapping unit 910 information indicating a mesh cell designated by mother robot 104, mapping information, information indicating a region not yet searched, and the like to apply an instruction signal instructing search of a region not yet searched within the mesh cell to flight control unit 907.

Flight control unit 907 applies a control signal to flight unit 908 based on an instruction signal applied from position information detection unit 906 to control flight unit 908. In the case where search robot 105 is a fluttering robot described above, flight control unit 908 is configured including a fluttering control unit 305 shown in FIG. 3. Flight unit 908 is configured including actuator 306, center of gravity control unit 307 and the like shown in FIG. 3 when it is the element constituting the flying function of search robot 105 and if search robot 105 is a fluttering robot described above. Control of a flight unit 908 by flight control unit 907 in the case where search robot 105 is a fluttering robot described above is as described previously. Therefore, description thereof will not be repeated.

Heart sound detection unit 912 applies the sound wave signal from sonar 905 to determination unit 914. Body heat detection unit 913 applies the infrared signal from infrared sensor 904 to determination unit 914. A microphone 918 picks up voices in the neighborhood to apply a voice signal to determination unit 914 via conversation unit 917.

Determination unit 914 determines whether the object found is a casualty based on the sound wave signal from heart sound detection unit 912, the infrared signal from body heat detection unit 913, and the voice signal applied from microphone 918 via conversation unit 917. Determination unit 914 provides the determination result to communication unit 920 via transmission unit 919, and provides the information to mother robot 104. Determination unit 914 also provides the determination result to notification unit 915.

Notification unit 915 notifies a casualty 103, in accordance with the determination result from determination unit 914, i.e. when the found object is a casualty 103, by issuing predetermined audio indicating that the device is a search robot 105.

Conversation unit 917 is connected to a speaker 916 and a microphone 918 to output from speaker 916 the operator's voice received from base station 100 at communication unit 920, or picks up the voice of a casualty 103 through microphone 918, and establishes conversation between the found casualty 103 and the operator of base station 100.

Communication relay unit 921 relays communication via communication unit 920 when direct communication between another search robot 105 and mother robot 104 or base station 100 cannot be established due to some trouble.

Referring to FIG. 10, mother robot 104 is charged with power, by a power source 1023, from charger 1105 (refer to FIG. 11) of base station 100 to supply power to appropriate components of mother robot 104 or to charge unit 1024. Charge unit 1024 charges the power supplied from power source 1023. Charge unit 1024 receives via power supply relay unit 1022 the power from mother robot 104 or base station 100 via a radio wave through communication unit 1020 for charging. Alternatively, charge unit 1024 supplies the charged power to appropriate components of mother robot 104, or supplies to search robot 105 from communication unit 1020 via power supply relay unit 1022.

Communication unit 1020 communicates with base station 100, search robot 105, or another mother robot 104. Specifically, communication unit 1020 transmits an instruction indicating a mesh cell to be searched towards search robot 105, or receives position information from search robot 105 or information related to mapping or an object found. Communication unit 1020 provides the mapping information from search robot 105 to mapping unit 1010 via transmission unit 1019.

Referring to FIG. 10, mother robot 104 includes an acceleration sensor 1001 detecting acceleration, an angular acceleration sensor 1002 detecting an angular acceleration, a GPS 1003 detecting a GPS signal, an infrared sensor 1004 detecting an infrared ray, and a CCD (Charge Coupled Device) 1005 detecting an image. Acceleration sensor 1001 and angular acceleration sensor 1002 apply the detected acceleration signals to position information detection unit 1006 and flight control unit 1007. GPS 1003 and infrared sensor 1004 apply the detected GPS signal and infrared signal to position information detection unit 1006. CCD 1005 applies the detected image signal to position change detection unit 1009.

Position information detection unit 1006 detects the current position of relevant mother robot 104 based on the acceleration signals from acceleration sensor 1001 and angular acceleration sensor 1002, the GPS signal from GPS 1003, and the infrared signal from infrared sensor 1004. Position information detection unit 1006 applies position information indicating the detected current position to mapping unit 1010.

Position change detection unit 1009 detects change in the position of current mother robot 104 based on the image signal applied from CCD 1005. Position change detection unit 1009 applies information in detecting change in the detected position to mapping unit 1010.

Mapping unit 1010 obtains mapping information based on the position information and mapping information received at communication unit 1020 from search robot 105 via transmission unit 1019, the position information applied from position information detection unit 1006, and the information applied from position change detection unit 1009. Mapping unit 1010 stores the obtained mapping information in memory 1011. Mapping unit 1010 provides the obtained mapping information to communication unit 1020 via transmission unit 1019, and provides the information to search robot 105 that requires the information. Mapping unit 1010 detects a region not yet searched based on the obtained mapping information.

Position information detection unit 1006 obtains mapping information, information indicating a region not yet searched, and the like from mapping unit 1010 to apply to flight control unit 1007 an instruction signal instructing to move to an appropriate position.

Flight control unit 1007 applies a control signal to flight unit 1008 based on the instruction signal applied from position information detection unit 1006 to control flight unit 1008. In the case where mother robot 104 is a fluttering robot described above, flight control unit 1007 is configured including fluttering control unit 305 shown in FIG. 3. In the case where flight unit 1008 is an element constituting the flight function of mother robot 104 and mother robot 104 is a fluttering robot described above, flight unit 1008 is configured including actuator 306, center of gravity control unit 307, and the like shown in FIG. 3. The control of flight unit 1008 by flight control unit 1008 is as described above when mother robot 104 is a fluttering robot as described above. Therefore, description thereof will not be repeated.

Arrange unit 1012 determines a mesh cell where search robot 105 is to be arranged based on position information received at communication unit 1020 from search robot 105 via transmission unit 1019 and mapping information obtained from mapping unit 1010. Arrange unit 1012 applies the instruction signal to arrange a search robot 105 in a determined mesh cell to communication unit 1020 via transmission unit 1019, to provide the instruction signal to search robot 105.

Determination unit 1014 determines whether the found object is a casualty or not based on information related to the found object received at communication unit 1020 from search robot 105 via transmission unit 1019, or based on information representative of a determination result. Determination unit 1014 applies the determination result to communication unit 1020 via transmission unit 1019 for output to base station 100.

Communication relay unit 1021 relays communication between search robot 105 and base station 100 via communication unit 1020.

Referring to FIG. 11, base station 100 includes a charge unit 1124 receiving power from a power source not shown for charging. The power charged at charge unit 1124 is supplied from power source 1123 to appropriate components in base station 100, or to charger 1105 provided in a station 1104 of search robot 105 and mother robot 104. Search robot 105 or mother robot 104 lands at a station 1104 of base station 100, and establishes connection between charger 1105 and power source 923 or 1023 to allow power supply from base station 100. The power charged at charge unit 1124 is supplied to communication unit 1120 via power supply unit 1122. The power is supplied to mother robot 104 or search robot 105 from communication unit 1120 via a radio wave.

Communication unit 1120 communicates with the mother robot 104 or search robot 105. Specifically, communication unit 1120 obtains mapping information, position information, and the like from mother robot 104 and search robot 105. Communication unit 1120 provides the obtained information to mapping unit 1110, arrange unit 1112, guide unit 1108, and determination unit 1114 via transmission unit 1119.

Information input unit 1125 is formed of a keyboard, a button, and the like to accept designation entry of a position to be searched or specification of information to be output by the operator.

Referring to FIG. 11, base station 100 includes GPS 1103 detecting a GPS signal. The detected GPS signal is applied to position information detection unit 1106. Position information detection unit 1106 detects the current position of relevant base station 100 based on the GPS signal from GPS 1103. Position information detection unit 1106 applies position information indicating the detected current position to mapping unit 1110.

Mapping unit 1110 produces mapping information of the entire area of disaster corresponding to the search, based on mapping information and position information obtained from mother robot 104 and search robot 105 from transmission unit 1119, and position information indicating the current position applied from position information detection unit 1106. Mapping unit 1110 stores the produced mapping information in memory 1111. Mapping unit 1110 provides the produced mapping information, (entirely or partially) to mother robot 104 or search robot 105 landed at station 1104. Alternatively, the mapping information is applied to communication unit 1120 via transmission unit 1119 to be output to mother robot 104 or search robot 105.

Position information detection unit 1106 obtains mapping information from mapping unit 1110 and applies the obtained mapping information to information output unit 1126 together with the position information indicating the detected current position. Information output unit 1126 corresponds to a display or a LED (Light Emitting Diode) display, an audio output apparatus such as a microphone, and the like. Information output unit 1126 provides the information from position information detection unit 1106 to the operator in a recognizable form.

Arrange unit 1112 determines the position where mother robot 104 is to be arranged based on the position information obtained from mother robot 104 and search robot 105 applied from transmission unit 1119, mapping information obtained from mapping unit 1110, instruction information related to the position of search applied from information input unit 1125, and the like. Arrange unit 1112 provides an instruction signal to arrange mother robot 104 at a determined position towards mother robot 104 landed at station 1104. Alternatively, an instruction signal is applied to communication unit 1120 via transmission unit 1119 for output to mother robot 104.

Determination unit 1114 determines whether the object found is a casualty or not based on information related to the found object obtained by mother robot 104 or search robot 105 applied from transmission unit 1119, or information representing a determination result. Determination unit 114 applies the determination result to communication unit 1120 via transmission unit 1119 for output towards mother robot 104 or search robot 105. Determination unit 1114 applies the determination result to information output unit 1126. Information output unit 1126 provides the determination result.

Route information output unit 1107 searches for a rescue route to reach a casualty 103 based on the mapping information obtained from mapping unit 1110 to output the information to mother robot 104 or search robot 105 landed at station 1104. Alternatively, information of the rescue route is applied to communication unit 1120 via transmission unit 1119 to be provided to mother robot 104 or search robot 105. Route information output unit 1107 applies information representing a route of rescue to guide unit 1108.

Guide unit 1108 is the means for guiding a rescue team to reach a casualty 103 found. The guide information is applied to communication unit 1120 via transmission unit 1119 to be provided to rescue robot 105 in the rescue team. Alternatively, guide information is provided to mother robot 104 instructing a route of rescue to search robot 105 in the rescue team.

Communication relay unit 1121 relays communication via communication unit 1120 when direct communication cannot be established between another search robot 105 and mother robot 104 due to some trouble.

The above search method in a search robot system can be provided in the form of a program product. Such a program can be recorded in a computer readable recording medium such as a flexible disk of a computer, a CD-ROM, a ROM, a RAM, a memory card, or a hard disk built in a computer to be provided as a program product. The program can be provided through down-loading via a network. The provided program product is installed into a hard disk to be read out into an RAM for execution. The program product includes a program and a recording medium in which the program is recorded.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A search robot system comprising:
   at least one search robot,
   a division unit dividing a search region into at least one mesh cell, and
   an arrange unit arranging said search robot in said mesh cell,
   wherein said search robot further includes a search region detection unit for detecting whether an obstacle has a cavity in which a search is to be conducted based on sonar information obtained from the surface of said obstacle.

2. The search robot system according to claim 1, wherein a search is initiated from an outermost mesh cell in contact with a boundary between said search region and outside said search region.

3. The search robot system according to claim 1, wherein said arrange unit arranges another search robot differing from said arranged search robot for a search in an inner mesh cell not in contact with said boundary of said search region.

4. The search robot system according to claim 1, wherein said arranged search robot moves to a mesh cell adjacent to said mesh cell to continue said search.

5. The search robot system according to claim 1, wherein said arrange unit arranges another search robot differing from said arranged search robot for a search in a mesh cell adjacent to said mesh cell.

6. The search robot system according to claim 1, wherein a search is conducted along a surface of an obstacle.

7. The search robot system according to claim 1, wherein said search robot includes a detection unit for detecting at least one of an obstacle and a surface of said obstacle using at least one of a sonar and an infrared ray.

8. The search robot system according to claim 1, wherein said search robot further includes a mapping unit for conducting mapping based on search information.

9. The search robot system according to claim 1, wherein said search robot further includes a first position information detection unit for detecting position information by at least one of an acceleration sensor and an angular acceleration sensor.

10. The search robot system according to claim 1, wherein said search robot further includes a second position information detection unit for detecting position information through a GPS.

11. The search robot system according to claim 1, further comprising an output unit for providing route information, when an object of search is sensed, up to a site of said object.

12. The search robot system according to claim 1, further comprising a guide unit for guiding said search robot, when an object of search is sensed, up to a site of said object.

13. The search robot system according to claim 1, wherein said search robot further includes a flight unit.

14. The search robot system according to claim 1, wherein said search robot further includes a first sensing unit for sensing a vital sign.

15. The search robot system according to claim 14, wherein said search robot further includes a determination unit for determining whether a sensed object is a human being or another animal based on said vital sign sensed by said first sensing unit.

16. The search robot system according to claim 14, wherein said search robot further includes a transmission unit for transmitting to an external source, when a human being or another animal alive is sensed by said first sensing unit, information thereof.

17. The search robot system according to claim 14, wherein said search robot further includes a notification unit for notifying, when a human being alive is sensed by said first sensing unit, a presence of a search robot.

18. The search robot system according to claim 14, wherein said search robot further includes a conversation unit for establishing, when a human being alive is sensed by said first sensing unit, conversation between said sensed human being alive and a searcher.

19. The search robot system according to claim 1, wherein said search robot further includes a second sensing unit for sensing body heat.

20. The search robot system according to claim 19, wherein said search robot further includes a determination unit for determining whether a sensed object is a human being or another animal based on the body heat sensed by said second sensing unit.

21. The search robot system according to claim 19, wherein said search robot further includes a transmission unit for transmitting to an external source, when a human being or another animal alive is sensed by said second sensing unit, information of the sensed object.

22. The search robot system according to claim 19, wherein said search robot further includes a notification unit for notifying, when a human being alive is sensed by said second sensing unit, a presence of a search robot.

23. The search robot system according to claim 19, wherein said search robot further includes a conversation unit for establishing when a human being alive is sensed by said second sensing unit, conversation between said sensed human being alive and a searcher.

* * * * *